UNITED STATES PATENT OFFICE.

JOHN M. WILSON, OF MONTCLAIR, NEW JERSEY, ASSIGNOR TO WILSON REMOVER COMPANY, OF NEWARK, NEW JERSEY, A CORPORATION OF NEW JERSEY.

COMPOSITION FOR REMOVING PAINT OR VARNISH.

1,036,946. Specification of Letters Patent. Patented Aug. 27, 1912.

No Drawing. Application filed June 13, 1910. Serial No. 566,544.

*To all whom it may concern:*

Be it known that I, JOHN MACNAULL WILSON, a citizen of the United States, residing at Montclair, in the county of Essex and State of New Jersey, have invented certain new and useful Improvements in Composition for Removing Paint or Varnish, of which the following is a specification.

This invention comprises a composition of matter suitable for use as a remover for paint and varnish or other finishes.

In my prior application Serial No. 526,816, filed November 8, 1909, I have described a composition of matter suited for removing paint and varnish and other finishes, said composition containing benzol, acetone, a material of waxy consistence and phenol. In said application I have pointed out that a composition of the above character possesses certain distinctive advantages among which the following may be mentioned: (1) The varnish or paint residues after application of the remover are of a consistence highly favorable to their removal, being non-sticky and colloidal or jelly-like, and retaining such consistence for long periods; (2) these residues may be removed by wiping, scraping, brushing or equivalent methods, leaving the surface in condition for the application of paint or varnish without the necessity of applying a solvent wash.

I have found that by somewhat modifying the proportions of the ingredients a further improved result may be secured, in that the remover is rendered capable of a more rapid action, and also of a wider range of action in that a single composition is effective for both paint and varnish. Furthermore, the remover is decidedly improved with respect to the consistence of the residues and with regard to the period during which they remain in a condition favorable for removal. It is further characteristic of the improved composition that the vapor tension of the volatile solvents therein is greatly reduced, which not only lessens the loss of these solvents by evaporation and increases the time during which the residues remain soft, but permits the substitution of wood alcohol for acetone in the formula without the highly objectionable results which usually follow the use of this material, and as specifically claimed in my copending application Serial No. 566,545, filed June 13, 1910.

My preferred composition is prepared as follows, it being understood that the invention is not limited to the precise proportions referred to by way of example: Approximately 34 parts of paraffin or equivalent material of waxy consistence is heated or boiled with about 68 parts of commercial phenol, which may include also other phenolic bodies, as the homologues of phenol. The resulting liquid composition or solution is then added in suitable proportions to a mixture of volatile solvents comprising benzol and a loosening finish solvent as alcohol or acetone. In case alcohol is employed I prefer to use methyl alcohol; and in case acetone is used it may be of any of the commercial grades, often containing considerable proportions of alcoholic or ketonic bodies. The preferred proportions of the mixture are:

| | |
|---|---|
| Phenol | 68 parts |
| Paraffin or equivalent waxy body | 34 " |
| Benzol | 299 " |
| Acetone or methyl alcohol or mixtures of these | 299 " |

The above composition possesses in the highest degree the above-mentioned distinctive characteristics, of leaving the paint or varnish residues in most favorable condition for removal and of leaving the cleaned surface in condition for immediate re-coating, although it will be understood that the usual solvent wash may be used should that at any time appear desirable.

Phenol is an essential constituent of the mixture in that it decreases the volatility of the solvent liquids, itself acts as a solvent for the varnish, and adapts the composition for use as a paint remover. Furthermore, being non-volatile at ordinary temperatures, it keeps the surface wet for long periods and therefore permits the residue to be removed with ease many hours after the application of the composition. Other important functions are related to its effects upon and in conjunction with the paraffin or equivalent material of waxy consistence, these effects being of several kinds. First, it greatly facilitates the suspension of any precipitate, owing partly doubtless to the increased specific gravity of the liquid due to its presence, and probably partly also to some definite chemical or physical action upon the waxy body; for it is found that the action of the composition, particularly in respect to the formation of an objectionable coating upon the cleaned surface, is far less favorable if paraffin be merely added to the liquid composition instead of being heated in presence of the phenol. In the second place, it so modifies the composition that the paint or varnish residues may be completely removed, by scraping, brushing, or other means, without leaving at the cleaned surface any deposit which requires removal by a supplemental solvent wash before re-coating. In the third place, the phenol, in conjunction with the other constituents of the composition, imparts to the residues the non-sticky and slow-hardening consistence which is so favorable to their ready removal. In the fourth place, the effectiveness of the composition is far less liable to be reduced by prolonged brushing, over either paint or varnish. Thus it is well known that in case of removers comprising volatile solvents and a waxy body, the effect of over-brushing is greatly to accelerate the evaporation of the solvents and thereby to lessen the efficiency of the remover; in the present case however the composition forms in conjunction with the paint or varnish residues a non-sticky, colloidal or jelly-like mass which dries or hardens very slowly, and prolonged brushing is found to have little effect upon the evaporation while serving to accelerate the cutting or solvent action. In order to secure these advantages in their highest degree I consider it essential that the phenol should be present in excess of 6% by weight, and preferably in excess of 7½% by weight of the combined ingredients of the composition. The preferred proportion of phenol is approximately 10% by weight of the composition. The paraffin or equivalent material of waxy consistence should not exceed 75% by weight of the phenol present, and is preferably used in approximately the proportion of 50% by weight thereof. If excessive proportions of paraffin be employed the surface of the wood after removal of the finish will be found unsuited for immediate re-coating, requiring the use of a solvent wash; and if the mixture be deficient in phenol the cutting action will be found less perfect and rapid and the residue sticky or rubber-like and comparatively difficult of removal.

It will be seen from the foregoing that the advantages of this remover depend primarily upon the employment of a certain proportion of phenol and a certain proportion of paraffin or waxy matter in relation thereto, these being combined with appropriate volatile solvents. As above stated, there appears to be a definite chemical or physical interaction between the phenol and the paraffin, and between the phenol and paraffin and the paint or varnish residues, as a result of which the residues acquire the easily removable character referred to.

I claim:

1. A composition suited for removing paint or varnish, containing a mixture of volatile solvents including a wax solvent and a loosening finish solvent capable of precipitating wax, phenol and a body of waxy consistence, the phenol in excess of six per cent. by weight of the composition and the waxy body not in excess of seventy-five per cent. by weight of the phenol.

2. A composition suited for removing paint or varnish, containing a mixture of volatile solvents including benzol and a loosening finish solvent capable of precipitating wax, phenol and a body of waxy consistence, the phenol in excess of six per cent. by weight of the composition and the waxy body not in excess of seventy-five per cent. by weight of the phenol.

3. A composition suited for removing paint or varnish, containing a mixture of volatile solvents including benzol and acetone, phenol and a body of waxy consistence, the phenol in excess of six per cent. by weight of the composition and the waxy body not in excess of seventy-five per cent. by weight of the phenol.

4. A composition suited for removing paint or varnish, containing a mixture of volatile solvents, including a wax solvent and a loosening finish solvent capable of precipitating wax, phenol and a body of waxy consistence, the phenol in excess of seven and one-half per cent. by weight of the composition and the waxy body not in excess of seventy-five per cent. by weight of the phenol.

5. A composition suited for removing paint or varnish, containing a mixture of volatile solvents, including a wax solvent and a loosening finish solvent capable of precipitating wax, phenol and a body of waxy consistence, the phenol in excess of nine per cent. by weight of the composition and the waxy body not in excess of seventy-five per cent. by weight of the phenol.

6. A composition suited for removing paint or varnish, containing a mixture of volatile solvents, including a wax solvent and a loosening finish solvent capable of precipitating wax, phenol and a body of waxy consistence, the phenol in excess of nine per cent. by weight of the composition and the waxy body not in excess of fifty-five per cent. by weight of the phenol.

In testimony whereof, I affix my signature in presence of two witnesses.

JOHN M. WILSON.

Witnesses:
JOSEPH KEMPF,
CHAS. C. GUNTERBERG.